United States Patent
Park

(10) Patent No.: US 8,549,195 B2
(45) Date of Patent: Oct. 1, 2013

(54) COMMUNICATION APPARATUS AND METHOD IN PLC

(75) Inventor: Jo Dong Park, Cheonan (KR)

(73) Assignee: LSIS Co., Ltd., Seoul (KR)

( * ) Notice: Subject to any disclaimer, the term of this patent is extended or adjusted under 35 U.S.C. 154(b) by 129 days.

(21) Appl. No.: 13/170,089

(22) Filed: Jun. 27, 2011

(65) Prior Publication Data
US 2012/0008667 A1 Jan. 12, 2012

(30) Foreign Application Priority Data
Jul. 7, 2010 (KR) ........................ 10-2010-0065438

(51) Int. Cl.
G06F 3/00 (2006.01)
G06F 9/44 (2006.01)

(52) U.S. Cl.
USPC .......................................... 710/48; 717/124

(58) Field of Classification Search
USPC 710/46–49, 106–107; 714/39; 717/124–129
See application file for complete search history.

(56) References Cited

U.S. PATENT DOCUMENTS

| | | | | |
|---|---|---|---|---|
| 4,312,066 A | * | 1/1982 | Bantz et al. | 714/30 |
| 5,903,718 A | * | 5/1999 | Marik | 714/38.13 |
| 5,983,018 A | * | 11/1999 | Kanzaki | 717/127 |
| 6,754,851 B2 | | 6/2004 | Yoshimura | |
| 7,669,072 B2 | * | 2/2010 | Vergnes et al. | 713/503 |
| 7,712,084 B2 | * | 5/2010 | Beuten et al. | 717/129 |
| 2002/0046364 A1 | * | 4/2002 | Yoshimura | 714/38 |
| 2005/0071538 A1 | * | 3/2005 | Chang et al. | 711/100 |
| 2006/0020910 A1 | * | 1/2006 | Schlanger et al. | 717/101 |
| 2006/0236032 A1 | * | 10/2006 | Campbell et al. | 711/118 |
| 2007/0214341 A1 | * | 9/2007 | Das | 712/38 |
| 2008/0183924 A1 | | 7/2008 | Vergnes et al. | |
| 2009/0248932 A1 | * | 10/2009 | Taylor et al. | 710/110 |

FOREIGN PATENT DOCUMENTS

| | | |
|---|---|---|
| CN | 101160567 | 4/2008 |
| JP | 3-70340 | 3/1991 |
| JP | 03070340 | 3/1991 |
| JP | 5-35501 | 2/1993 |
| JP | 5-56022 | 3/1993 |
| JP | 2007-19944 | 1/2007 |

OTHER PUBLICATIONS

In the Japanese Patent Office Application Serial No. 2011-150548, Office Action dated Nov. 8, 2012, 3 pages.
The State Intellectual Property Office of the People's Republic of China Application Serial No. 201110194104.7, Office Action dated Apr. 3, 2013, 7 pages.

* cited by examiner

*Primary Examiner* — Christopher Shin
(74) *Attorney, Agent, or Firm* — Lee, Hong, Degerman, Kang & Waimey

(57) ABSTRACT

Disclosed is a communication apparatus and method in a programmable logic controller (PLC). In a communication method, a micro processing unit (MPU) decides whether or not an interrupt signal is generated. When it is decided that the interrupt signal has been generated, the MPU communicates with an external programming and debugging tool (PADT).

8 Claims, 3 Drawing Sheets

COMMUNICATION APPARATUS AND METHOD IN PLC

CROSS-REFERENCE TO RELATED APPLICATION

This application claims the benefit of earlier filing date and right of priority to Korean Patent Application No. 10-2010-0065438, filed Jul. 7, 2010, the contents of which are hereby incorporated herein by reference in their entirety.

FIELD OF THE DISCLOSURE

An aspect of the disclosure relates to a communication apparatus and method, and more specifically, to a communication apparatus and method used in a programmable logic controller (PLC).

DISCUSSION OF THE RELATED ART

In a PLC having a general-purpose micro processing unit (MPU), the MPU has at least two universal asynchronous receiver transmitter (UART) ports.

Among the at least two UART ports, a first UART port communicates with a programming and debugging tool (PADT) so as to download a predetermined operating program developed by a user using the PADT.

The PLC has a built-in communication module for performing communication with an external device such as an external PLC. A second UART port provided to the MPU performs communication with the communication module built in the PLC.

In the PLC, the first UART port provided to the MPU communicates with the PADT only when downloading the predetermined operating program. In a case where the downloading of the predetermined operating program is completed, the first UART port no longer communicates.

The MPU frequently communicates with the communication module. However, it is very rare that the MPU downloads the predetermined operating program by performing communication with the PADT.

Therefore, the first UART port that communicates with the PDAT is not used except when downloading the operating program, and hence hardware is wasted.

SUMMARY OF THE DISCLOSURE

Embodiments of the disclosure provide a communication apparatus and method in a programmable logic controller (PLC), in which one universal asynchronous receiver transmitter (UART) port is provided to a micro processing unit (MPU), and the MPU can selectively communicates with an external communication module and an external programming and debugging tool (PADT) using the one UART port.

According to an aspect of the disclosure, there is provided a communication apparatus including: a micro processing unit (MPU) configured to selectively communicate with an external communication module or an external programming and debugging tool (PADT); a first line driver provided between the MPU and the communication module so as to allow a data to be transmitted/received between the MPU and the communication module; a second line driver provided between the MPU and the PADT so as to allow data to be transmitted/received between the MPU and the PADT, the second line driver outputting an interrupt signal when a predetermined data is received from the PADT; and a switching unit configured to perform switching so that the MPU selectively communicates with the communication module or the PADT under a control of the MPU.

According to another aspect of the disclosure, there is provided a communication method including: deciding, by an MPU, whether an interrupt signal is generated; and communicating, by the MPU, with an external PADT when it is decided that the interrupt signal has been generated.

As described above, the communication apparatus and method according to the disclosure, the MPU has one UART port to selectively communicate with the external communication module and the external PADT, thereby minimizing waste of hardware.

BRIEF DESCRIPTION OF THE DRAWINGS

These and/or other aspects and advantages of the disclosure will become apparent and more readily appreciated from the following description of the embodiments, taken in conjunction with the accompanying drawings of which.

DETAILED DESCRIPTION OF PREFERRED EMBODIMENTS

Figure 1:
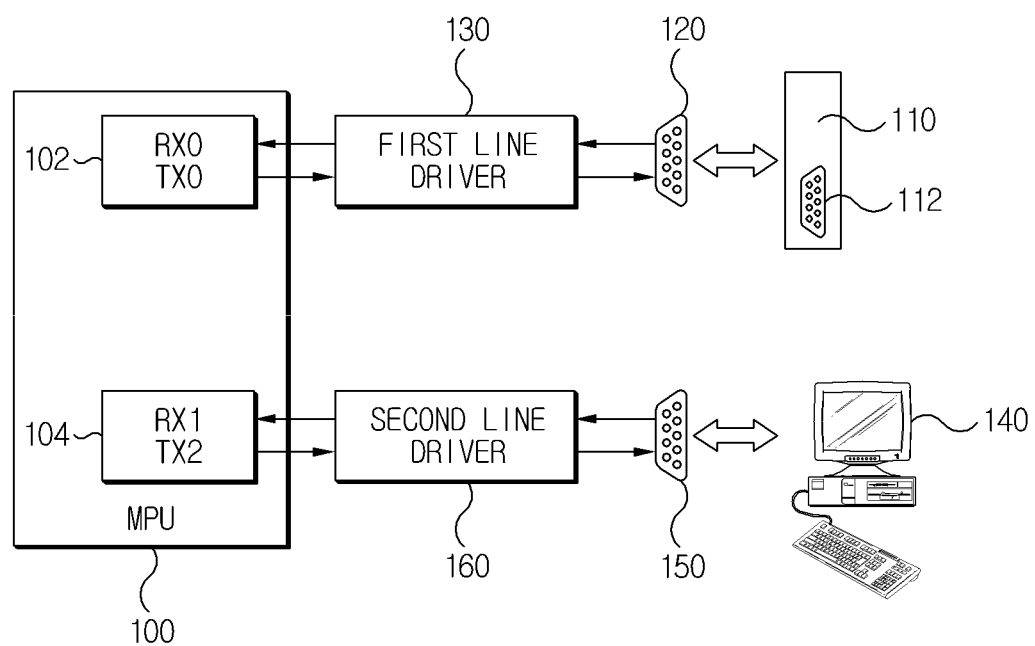
FIG. 1 is a schematic configuration view of a general communication apparatus in a PLC.

The disclosure is described more fully hereinafter with reference to the accompanying drawings, in which embodiments of the disclosure are shown. This disclosure may, however, be embodied in many different forms and should not be construed as limited to the embodiments set forth herein. Rather, these embodiments are provided so that this disclosure is thorough, and will fully convey the scope of the disclosure to those skilled in the art.

It will be understood that, although the terms "first", "second", etc. may be used herein to describe various elements, these components, should not be limited by these terms. These terms are only used to distinguish one element from another element. Thus, a "first" element discussed below could also be termed a "second" element without departing from the teachings of the disclosure. The sequence of operations (or steps) is not limited to the order presented in the claims or figures unless specifically indicated otherwise.

It will be understood that when an element is referred to as being "coupled" or "connected" to another element, it can be directly coupled or connected to the other element or intervening elements may also be present. In contrast, when an element is referred to as being "directly coupled" or "directly connected" to another element, there are no intervening elements present. Like numbers refer to like elements throughout. As used herein the term "and/or" includes any and all combinations of one or more of the associated listed items.

The terminology used herein is for the purpose of describing particular embodiments only and is not intended to be limiting of the disclosure. As used herein, the singular forms "a", "an" and "the" are intended to include the plural forms as well, unless the context clearly indicates otherwise.

It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

In the drawings, the size and relative sizes of layers and regions may be exaggerated for clarity. The drawings are not to scale. Like reference numerals refer to like elements throughout.

FIG. 1 is a schematic configuration view of a general communication apparatus in a programmable logic controller (PLC). Here, reference numeral 100 denotes a micro processing unit (MPU). The MPU 100 controls the entire operation of the PLC. The MPU 100 has a first universal asynchronous receiver transmitter (UART) port 102 and a second UART port 104, and communicates with an external device through the first and second UART ports 102 and 104.

For example, the MPU 100 communicates with an external communication module 110 through the first UART port 102. The MPU 100 downloads a predetermined operating program by communicating with an external programming and debugging tool (PADT) 140 through the second UART port 104.

Reference numeral 120 denotes a first connector. The first connector 120 is electrically connected to a connector 112 provided to the external communication module 110 so that a predetermined electrical signal is transferred between the MPU 100 and the external communication module 110.

Reference numeral 130 denotes a first line driver. The first line driver 130 converts the voltage level of a predetermined data outputted from a transmission terminal TX0 of the first UART port 102 in the MPU 100 into a voltage level suitable for the communication module 110 and then outputs the predetermined data with the converted voltage level to the connector 112 of the communication module 110 through the first connector 120. The first driver 130 converts the voltage level of a predetermined data outputted through the connector 112 of the communication module 110 and then inputted through the first connector 120 into a voltage level suitable for the MPU 100 and then outputs the predetermined data with the converted voltage level to a reception terminal RX0 of the first UART port 102.

Reference numeral 140 denotes the PADT. The PADT 140 generates a predetermined operating program with which the PLC is operated under a user's operation, and allows the MPU 100 to download and store the generated operating program.

Reference numeral 150 denotes a second connector. The second connector 150 is electrically connected to a connector (not shown) provided to the PADT 140 so that a predetermined electrical signal is transferred between the MPU 100 and the PADT 140.

Reference numeral 160 denotes a second line driver. The second line driver 160 converts the voltage level of a predetermined data outputted from a transmission terminal TX1 of the second UART port 104 in the MPU 100 into a voltage level suitable for the PADT 140 and then outputs the predetermined data with the converted voltage level to the PADT 140 through the second connector 150. The second line driver 160 converts the voltage level of a predetermined data inputted through the second connector 150 from the PADT 140 into a voltage level suitable for the MPU 100 and then outputs the predetermined data with the converted voltage level to a reception terminal RX1 of the second UART port 104.

In the communication apparatus in the PLC, configured as described above, when the MPU 100 performs communication with an external device, the predetermined data is outputted through the transmission terminal TX0 of the first UART 102.

The voltage level of the predetermined data outputted through the transmission terminal TX0 of the first UART 102 is converted into a voltage level suitable for the communication module 110 in the first line driver 130 and then inputted to the communication module 110 through the first connector 120 and the connector 112 so as to be transmitted to the external device.

The predetermined data inputted to the communication module 110 from the external device is inputted to the first line driver 130 through the connector 112 and the first connector 120. The first line driver 130 converts the voltage level of the predetermined data inputted to the communication module 110 into a voltage level for the MPU 100 and then inputs the predetermined data with the converted voltage level to the MPU 100 through the reception terminal TX1 of the second UART port 102.

That is, the MPU 100 outputs/inputs the predetermined data, which the communication module 110 transmits/receives to/from the external device, by communicating with the communication module 110 through the first UART port 102.

Further, When the MPU 100 downloads a predetermined operating program from the PADT 140, the voltage level of the predetermined data outputted through the transmission terminal TX1 of the second UART port 104 in the MPU 100 is converted into a voltage level suitable for the PADT 140 through the second line driver 160 and then transmitted to the PADT 140 through the second connector 150.

The voltage level of the predetermined operating program provided from the PADT 140 is inputted to the second line driver 160 through the second connector 150 so as to be converted into a voltage level suitable for the MPU 100, and then inputted to the MPU 100 through the reception terminal RX1 of the second UART port 104.

In the communication apparatus in the PLC, the MPU 100 has the first UART port 102 and the second UART port 104.

The first UART port 102 frequently communicates with the communication module 110 of the PLC. However, the second UART port 104 communicates with the PADT 140 only when performing renewal by downloading the predetermined operating program. Otherwise, the second UART port 104 is in an idle state.

Since it is very rare that the MPU 100 is renewed by downloading the predetermined operating program, the second UART port 104 with a small number of communications is provided to the MPU 100, and therefore, hardware is wasted.

In a case where a general-purpose MPU relatively inexpensively purchasable is used in the PLC, one UART port is preferably provided to the MPU so that the MPU can selectively perform communication with a communication module and a PADT.

Figure 2:
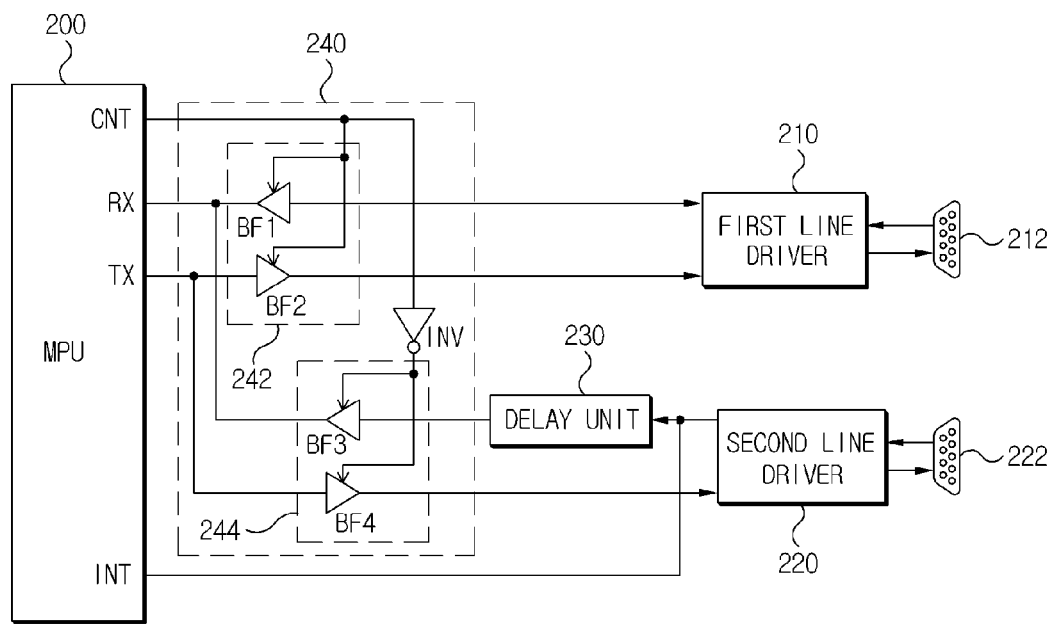
FIG. 2 is a configuration view of a communication apparatus according to an embodiment of the disclosure.

FIG. 2 is a configuration view of a communication apparatus in a PLC according to an embodiment of the disclosure.

As shown in this figure, reference numeral 200 denotes an MPU. The MPU 200 controls the entire operation of the PLC. The MPU 200 has one UART port composed of a reception terminal RX and a transmission terminal TX. The MPU 200 selectively communicates with an external communication module (not shown) or external PADT (not shown) through the UART port while outputting a control signal to a control terminal CNT in response to an interrupt signal inputted to an interrupt terminal INT.

Reference numeral 210 denotes a first line driver. The first line driver 210 is electrically connected to the communication module through a connector 212. The first line driver 210 converts the voltage level of a predetermined data provided from MPU 200 into a voltage level suitable for the communication module and then transmits the predetermined data with the converted voltage level to the communication module through the connector 212. The first line driver 210 converts the voltage level of a predetermined data provided from the communication module through the connector 212 into a voltage level suitable for the MPU 200.

Reference numeral 220 denotes a second line driver. The second line driver 220 is electrically connected to the PADT through a connector 222. The second line driver 220 converts the voltage level of a predetermined data provided from the MPU 200 into a voltage level suitable for the PADT and then transmits the predetermined data with the converted voltage level to the PADT through the connector 222. The second line driver 220 converts the voltage level of a predetermined data provided from the PADT through the connector 222 into a voltage level suitable for the MPU 200. In a case where the predetermined data is received from the PADT, the second line driver 220 generates an interrupt signal and applies the generated interrupt signal to the interrupt terminal INT.

Reference numeral 230 denotes a delay unit. The delay unit 230 delays data outputted from the PADT through the second line driver 220 for a predetermined time.

Reference numeral 240 denotes a switching unit. The switching unit 240 performs switching so that the MPU 200 selectively communicates with the external communication module or the external PADT in response to a control signal outputted to the control terminal CNT by the MPU 200.

The switching unit 240 includes a first transmitter 242, a second transmitter 244 and an inverter INV.

The first transmitter 242 activates buffers BF1 and BF2 in response to the control signal outputted to the control terminal CNT from MPU 200. Thus, the first transmitter 242 outputs the data received from the communication module by the first line driver 210 to the reception terminal RX of the MPU 200, and transmits the data outputted to the transmission terminal TX by the MPU 200 to the first line driver 210

The inverter INV inverts the control signal outputted to the control terminal CNT by the MPU 200.

The second transmitter 244 is activated in response to an output signal of the inverter INV. Thus, the second transmitter 244 outputs data outputted from the delay unit 230 to the reception terminal RX of the MPU 200, and transmits the data outputted to the transmission terminal TX by the MPU 200 to the second line driver 220.

In the communication apparatus in the PLC according to the embodiment of the disclosure, configured as described above, the MPU 200 first outputs a high voltage of logic '1' to the control terminal CNT. The high voltage of logic '1' is applied to the control terminals of the buffers BF1 and BF2 in the first transmitter 242 of the switching unit 240 and simultaneously inverted as a low voltage of logic '0' through the inverter INV. The low voltage of logic '0' inverted in the inverter INV is applied to the control terminals of buffers BF3 and BF4 of the second transmitter 244. Then, the buffers BF1 and BF2 are activated to pass the inputted data, and the buffers BF3 and BF4 are in a cut-off state so as to cut off the data.

In this state, the voltage level the data inputted to the first line driver 210 through the connector 212 from the communication module is converted into a voltage level suitable for the MPU 200 in the first line driver 210, and then the data with the converted voltage level is inputted to the reception terminal RX of the MPU 200 through the buffer BF1.

The data outputted to the transmission terminal TX by the MPU 200 is inputted to the first line driver 210 through the buffer BF2. The voltage level of the data is converted into a voltage level suitable for the communication module, and then the data with the converted voltage level is transmitted to the communication module through the connector 212.

That is, in a case where the MPU 200 outputs the high voltage of logic '1' to the control terminal CNT, the MPU 200 communicates with the external communication module.

In a case where the external PADT transmits a predetermined data, the data transmitted from the PADT is inputted to the second line driver 220 through the connector 222. Thus, the voltage level of the data is converted into a voltage level suitable for the MPU 200, and then the data with the converted voltage level is outputted.

The data outputted from the second line driver 220 is inputted to the delay unit 230 so as to be delayed for a predetermined time, and simultaneously applied as an interrupt signal to the interrupt terminal INT of the MPU 200.

Then, the MPU 200 decides that the data transmitted from the PDAT has been received, and outputs the low voltage of logic '0' to the control terminal CNT.

The low voltage of logic '0' outputted to the control terminal CNT is applied to the control terminals of the buffers BF1 and BF2 in the first transmitter 242.

Simultaneously, the low voltage of logic '0' is inverted to the high voltage of logic '1' through the inverter INV, and then the high voltage of logic '1' is applied to control terminals of the buffers BF3 and BF4 in the second transmitter 244. The buffers BF1 and BF2 are in a cut-off state, and the buffers BF3 and BF4 are in an active state, thereby passing the data.

In this state, the data delayed in the delay unit 230 is inputted to the reception terminal RX of the MPU 200 through the buffer BF3. The data outputted to the transmission terminal TX of the MPU 200 is inputted to the second line driver 220 through the buffer BF4 so that the voltage level of the data is converted into a voltage level suitable for the PADT, and then the data with the converted voltage level is transmitted to the PADT through the connector 222.

Here, all the data transmitted from the PADT are necessarily inputted to the MPU 200 without loss. To this end, the communication apparatus in accordance with the embodiment of the present invention has the delay unit 230, and the delay time of the delay unit 230 may be set to a sufficient time or longer, taken from when the interrupt signal is applied to the interrupt terminal INT of the MPU 200 to when the buffer BF3 is activated by generating the control signal of logic '0' to the control terminal CNT of the MPU 200.

Figure 3:
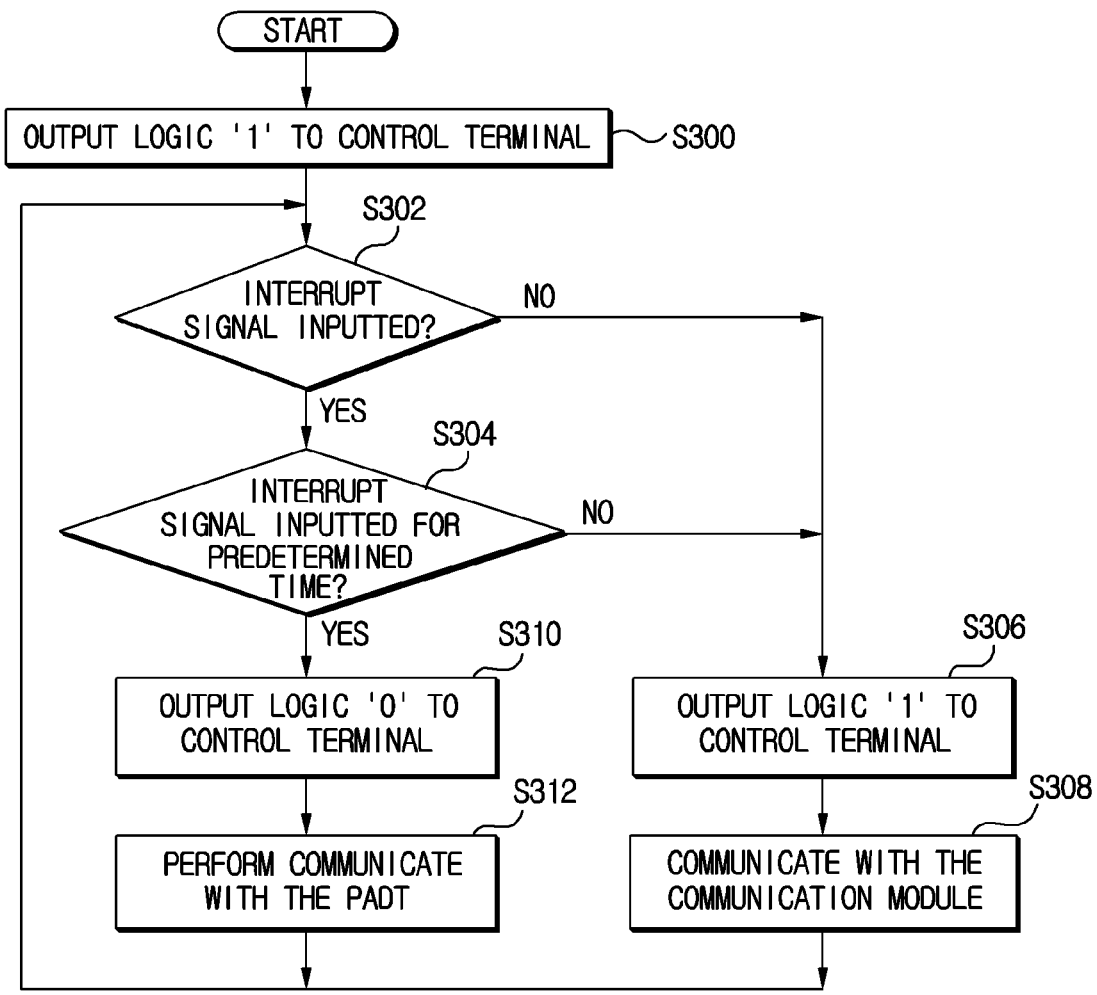
FIG. 3 is a flowchart illustrating a communication method according to an embodiment of the disclosure.

FIG. 3 is a flowchart illustrating a communication method according to an embodiment of the disclosure, which illustrates operations of the MPU 200.

Referring to FIG. 3, the MPU 200 first communicates with the communication module connected to the connector 212 by outputting a high voltage of logic '1' to the control terminal CNT (S300).

That is, as the MPU 200 outputs the high voltage of logic '1' to the control terminal CNT, the buffers BF1 and BF2 in the first transmitter 242 are in an active state so as to pass data. Therefore, the data outputted to the transmission terminal TX by the MPU 200 is inputted to the first line driver 210 through the buffer BF2 so as to be processed, and then outputted to the communication module through the connector 212. The data transmitted from the communication module is inputted to the first line driver 210 through the connector 212 so as to be processed, and then inputted to the reception terminal RX of the MPU 200 through the buffer BF1 so that the MPU 200 communicates with the communication module.

In this instance, the MPU 200 decides whether or not an interrupt signal is inputted to the interrupt terminal INT (S302). In a case where the interrupt signal is inputted to the interrupt terminal INT, the MPU 200 decides whether or not the interrupt signal is inputted for a predetermined time or longer (S304).

That is, in a case where the interrupt signal is inputted to the interrupt terminal INT, the interrupt signal can be instantaneously inputted by a noise signal or the like. In a case where the interrupt signal is inputted, the MPU 200 decides whether or not the interrupt signal is a true interrupt signal that is maintained for the predetermined time or longer.

In a case where it is decided that the interrupt signal is not inputted or the inputted interrupt signal is not maintained for the predetermined time or longer, the MPU 200 decides not to perform communication with the PADT. Thus, the MPU 200 outputs the high voltage of logic '1' to the control terminal CNT (S306), and transmits/receives predetermined data to/from the communication module connected to the connector 212 (S308).

In a case where it is decided that the interrupt signal is inputted to the interrupt terminal INT and the inputted interrupt signal is maintained for the predetermined time or longer, the MPU 200 outputs a low voltage of logic '0' to the control terminal CNT so as to perform communication with the PADT connected to the connector 222 (S310).

That is, in a case where the MPU 200 outputs the low voltage of logic '0' to the control terminal CNT, the low voltage of logic '0' is converted into the high-voltage of logic '1' in the inverter INV, and then the high-voltage of logic '1' is applied to the control terminals of the buffers BF3 and BF4. Thus, the buffers BF3 and BF4 pass the data in the active state.

Then, the data outputted to the transmission terminal TX by the MPU 200 is inputted to the second line driver 220 through the buffer BF4 so as to be processed, and then transmitted to the PADT through the connector 222. The data outputted from the PADT is inputted to the second line driver 220 through the connector 222 and delayed in the delay unit 230. Then, the data is inputted to the reception terminal RX of the MPU 200 through the buffer BF3 so as to be in a communicable state.

In this state, the MPU 200 performs communication with the PADT (S312). The MPU 200 can be renewed using a predetermined program provided from the PADT.

Although the present invention has been described in connection with the preferred embodiments, the embodiments of the present invention are only for illustrative purposes and should not be construed as limiting the scope of the present invention. It will be understood by those skilled in the art that various changes and modifications can be made thereto within the technical spirit and scope defined by the appended claims.

What is claimed is:

1. A communication apparatus comprising:
    a micro processing unit (MPU) configured to selectively communicate with an external communication module or an external programming and debugging tool (PADT);
    a first line driver provided between the MPU and the communication module so as to allow a data to be transmitted/received between the MPU and the communication module;
    a second line driver provided between the MPU and the PADT so as to allow data to be transmitted/received between the MPU and the PADT, the second line driver outputting an interrupt signal when a predetermined data is received from the PADT; and
    a switching unit configured to perform switching so that the MPU selectively communicates with the communication module or the PADT under a control of the MPU, wherein the switching unit comprises:
    a first transmitter provided between the MPU and the first line driver, and activated in response to the control signal outputted from the MPU so as to pass data;
    an inverter configured to invert the control signal outputted from the MPU; and
    a second transmitter provided between the MPU and the second line driver, and activated in response to an output signal of the inverter so as to pass data.

2. The communication apparatus of claim 1, wherein the MPU has one universal asynchronous receiver transmitter (UART) port composed of reception and transmission terminals, and outputs a control signal for selectively communicating with the communication module or the PADT in response to the interrupt signal inputted to an interrupt terminal.

3. The communication apparatus of claim 1, wherein the first line driver transmits/receives data between the MPU and the communication module by converting the voltage level of the data inputted from the communication module into a voltage level suitable for the MPU and converting the voltage level of the data provided from the MPU into a voltage level suitable for the communication module.

4. The communication apparatus of claim 1, wherein the second line driver transmits/receives data between the MPU and the PADT by converting the voltage level of the data inputted from the PADT into a voltage level suitable for the MPU and converting the voltage level of the data provided from the MPU into a voltage level suitable for the PADT.

5. The communication apparatus of claim 1, wherein, when data is inputted from the PADT, the second line driver outputs the interrupt signal for a predetermined time and transmits the data inputted from the PADT to the MPU.

6. The communication apparatus of claim 1, wherein the switching unit further comprises a delay unit configured to delay the data outputted from the second line driver for a predetermined time and provide the delayed data to the MPU.

7. A communication method comprising:
    communicating, by a micro processing unit (MPU), with an external communication module;
    delaying, by a delay unit, data transmitted from a programming and debugging tool (PADT);
    deciding, by the MPU, whether or not an interrupt signal is received;
    outputting a control signal so as to perform communication between the MPU and the PADT when the interrupt signal is received and the interrupt signal is maintained for a predetermined time;
    receiving the data delayed for the predetermined time by the delay unit; and
    transmitting and receiving data between the MPU and the PADT in response to the control signal.

8. The communication method of claim 7, wherein the predetermined time is set to a time or longer, taken from when the interrupt signal is applied to when the control signal is outputted.

* * * * *